(12) United States Patent
McDonald

(10) Patent No.: US 7,933,942 B2
(45) Date of Patent: Apr. 26, 2011

(54) LOW COST, HIGH PURITY SIGN WAVE GENERATOR

(75) Inventor: William Scott McDonald, Littleton, MA (US)

(73) Assignee: Teradyne, Inc., North Reading, MA (US)

( * ) Notice: Subject to any disclaimer, the term of this patent is extended or adjusted under 35 U.S.C. 154(b) by 1212 days.

(21) Appl. No.: 11/540,810

(22) Filed: Sep. 29, 2006

(65) Prior Publication Data
US 2008/0109504 A1    May 8, 2008

(51) Int. Cl.
*G06F 1/02* (2006.01)
(52) U.S. Cl. .......................................... 708/276
(58) Field of Classification Search ............... None
See application file for complete search history.

(56) References Cited

U.S. PATENT DOCUMENTS

| | | | | |
|---|---|---|---|---|
| 4,901,265 | A * | 2/1990 | Kerr et al. ............ | 708/276 |
| 5,999,581 | A * | 12/1999 | Bellaouar et al. ........ | 375/377 |
| 6,359,575 | B1 * | 3/2002 | Knudsen ............... | 341/118 |
| 6,489,911 | B1 | 12/2002 | O'Dwyer | |
| 7,580,964 | B2 * | 8/2009 | Merlo et al. ........... | 708/276 |
| 2001/0054974 | A1 * | 12/2001 | Wright ................. | 341/144 |
| 2006/0125669 | A1 * | 6/2006 | Dempsey et al. ......... | 341/144 |
| 2008/0005213 | A1 * | 1/2008 | Holtzman .............. | 708/276 |

OTHER PUBLICATIONS

International Search Report and Written Opinion from International Application Serial No. PCT/US2007/020920, Aug. 28, 2008.
Langlois et al., "ROM size reduction with low processing cost for direct digital frequency synthesis," 2001 IEEE Pacific Rim Conference on Communications, Computers and Signal Processing, Victoria, British Columbia, Canada, Aug. 26-28, 2001, *IEEE, US*:1:287-290 (2001).
Sodagar et al., "Mapping From Phase to Sine-Amplitude in Direct Digital Frequency Synthesizers Using Parabolic Approximation," *IEEE Transactions on Circuits and Systems II: Express Briefs, IEEE Service Center*, New York NY Dec. 1, 2000, 47(12):1452-1457 (2000).

* cited by examiner

*Primary Examiner* — David H Malzahn
(74) *Attorney, Agent, or Firm* — Wolf, Greenfield & Sacks, P.C.

(57) ABSTRACT

An automatic test system that includes low cost and accurate circuitry for generating sinusoidal signals. Each sinusoidal signal generator produces a series of digital values approximating a sine wave. These values are computed, avoiding the need for large memories to store tables representing sine waves. Inaccuracies in the representation of the sine waves do not impact the accuracy of the resultant sine wave because circuitry used to correct for non-linearity errors in a digital-to-analog converter is programmed to also correct for errors introduced by approximating a sine wave with a computed function. A simple parabolic function may be used to compute approximations of a sine wave.

19 Claims, 7 Drawing Sheets

LOW COST, HIGH PURITY SIGN WAVE GENERATOR

BACKGROUND OF INVENTION

1. Field of Invention

The invention relates generally to automatic test equipment and more particularly to generation of signals for testing semiconductor devices.

2. Discussion of Related Art

Semiconductor devices are tested, often multiple times, during their manufacture. A piece of automatic test equipment, referred to as "ATE" or a "tester," is used to generate test signals that stimulate a device under test (DUT) and to measure a response from the DUT. The tester determines whether the DUT is operating properly by comparing the response evoked by a carefully controlled pattern of test signals with an expected response.

To fully test devices, the tester should generate and measure signals like those in the intended operating environment of those devices. Because numerous types of semiconductor devices need to be tested, automatic test equipment is designed to be programmable so that it may generate or measure the signals needed to test any desired type of semiconductor device.

Further, the test signals must be generated accurately. Inaccurate test signals lead to inaccurate test results, which in turn can lead to semiconductor devices that actually perform as expected being classified as defective devices and discarded. Inaccuracy in test signals may also create uncertainty in test results such that, for some subset of devices tested, it is impossible to determine whether the device operates as expected. When uncertainty precludes a determination of whether a device is operating correctly, the device is classified as defective and discarded. Therefore, inaccurate signal generation in a tester can have a high cost associated with it.

Sinusoidal signals are one type of signal frequently generated within a tester. For example, a sinusoidal signal may be applied to the device under test so that the response by the device to the sinusoidal signal may be measured. In other instances, the sinusoidal signal is used for timing signals that are applied to the device under test.

Regardless of how the sinusoidal signal is used as a test signal, inaccuracies in generating the signal can impact the test results. If the sinusoidal signal is applied directly to the device under test, the measured response may not be as expected—not because the device is defective, but because the test signal was not as expected. If the sinusoidal signal is used for timing other events, the expected response may not be detected—not because the device failed to produce the response, but because the tester measured the response at the wrong time. Accordingly, accurate generation of programmable sinusoidal signals is important in many aspects of an automatic test system.

Some testers use direct digital synthesis (DDS) to generate sinusoidal signals of programmable frequency. A traditional approach for generating a sinusoidal signal using DDS is to store in a look-up table values representing a cycle of a sinusoidal signal. A phase accumulator periodically generates phase values that act as addresses to the look-up table. The value in the accumulator increases each period by a programmed phase increment. When the values from the phase accumulator are used to address the look-up table, the output of the look-up table is a sequence of values representing points on a sine wave that are spaced in phase by the phase increment. To produce a periodic signal, the phase accumulator uses modular arithmetic when it increases the accumulated phase by the phase increment. When adding the phase increment to the accumulated phase would result in a phase value beyond the end of one cycle of the sine wave, the phase accumulator converts that phase value to a phase value an equivalent distance from the start of the cycle that is stored in the look-up table.

The magnitude of that programmed phase increment controls the length of time it takes for the output of the look-up table to trace out one cycle of the sine wave. This time is inversely proportional to the frequency of the sine wave generated so that specifying the phase increment provides a mechanism to program the frequency of the sine wave.

The values in the series output from the look-up table may be converted to an analog signal, which is a sine wave of the programmed frequency.

SUMMARY OF INVENTION

Low cost, and accurate circuitry for generating sinusoidal signals of a programmable frequency may be implemented by digitally generating a signal that approximates a sine wave. Though such a signal could produce a sine wave with high distortion if used directly, circuitry that corrects non-linearity errors may be used to reduce the distortion. The same circuitry that corrects for nonlinearity errors in a digital to analog converter or other portions of the test system used to generate the sine wave also may correct for nonlinearity errors introduced by using a digital signal that only approximates a sine wave.

The digital signal approximating a sine wave may be computed as a parabolic function. Because the parabolic function may be computed—rather than stored in a look-up table—field programmable gate arrays, or other components with limited onboard memory, can be used to generate the sinusoidal approximation. Because such components are available at low cost and are frequently incorporated in test systems for other reasons, a sinusoidal signal generator according to an embodiment of the invention may be readily incorporated into a test system at a low cost.

In one aspect, the invention relates to an apparatus for generating a sinusoidal signal. The apparatus comprises a digital to analog converter having a digital input and an analog output. The digital to analog converter is adapted to produce an analog signal at the analog output representative of digital values at the digital input. The analog signal comprises an error represented by a conversion error function. The apparatus includes a first circuit having an output providing a plurality of values approximating at least a portion of a sinusoidal signal. The plurality of values has an approximation error. The apparatus also comprises a second circuit coupled between the output of the first circuit and the digital input of the digital to analog converter. The second circuit is adapted to distort the values at the output of the first circuit to compensate, at least in part, for the conversion error function of the digital to analog converter and the approximation error of the first circuit.

In another aspect, the invention relates to apparatus for generating a plurality of sinusoidal signals. The apparatus comprises, for each of the plurality of sinusoidal signals, a digital to analog converter having a digital input and an analog output. The digital to analog converter is adapted to produce an analog signal at the analog output representative of digital values at the digital input. The apparatus also comprises a first circuit having an output providing a plurality of values approximating at least a portion of a sinusoidal signal. The plurality of values comprises an approximation error. The apparatus also comprises a second circuit coupled between the output of the first circuit and the digital input of the digital to analog converter. The second circuit is adapted to distort the values at the output of the first circuit to compensate, at least in part, for the approximation error of the first circuit.

In a further aspect, the invention relates to a method of generating a sinusoidal signal. The method comprises generating a string of digital values representing an approximation of at least a portion of a sinusoidal signal; distorting the digital values to compensate for an error in approximating the sinusoidal signal and a conversion error; and converting the distorted digital values to an analog signal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a semiconductor test system may be improved with an accurate, programmable sinusoidal signal generator that is readily implemented at low cost as part of a test system. According to an embodiment of the invention, a sinusoidal signal generator is implemented without look-up tables to store a representation of the sinusoidal signal. As a result, the sinusoidal signal generator may be readily implemented within a field programmable gate array or other semiconductor device that has limited memory. Reducing the need for large amounts of memory to store a look-up table as part of a sinusoidal signal generator may be particularly desirable as part of an automatic test system that includes multiple sinusoidal signal generators.

Figure 1:
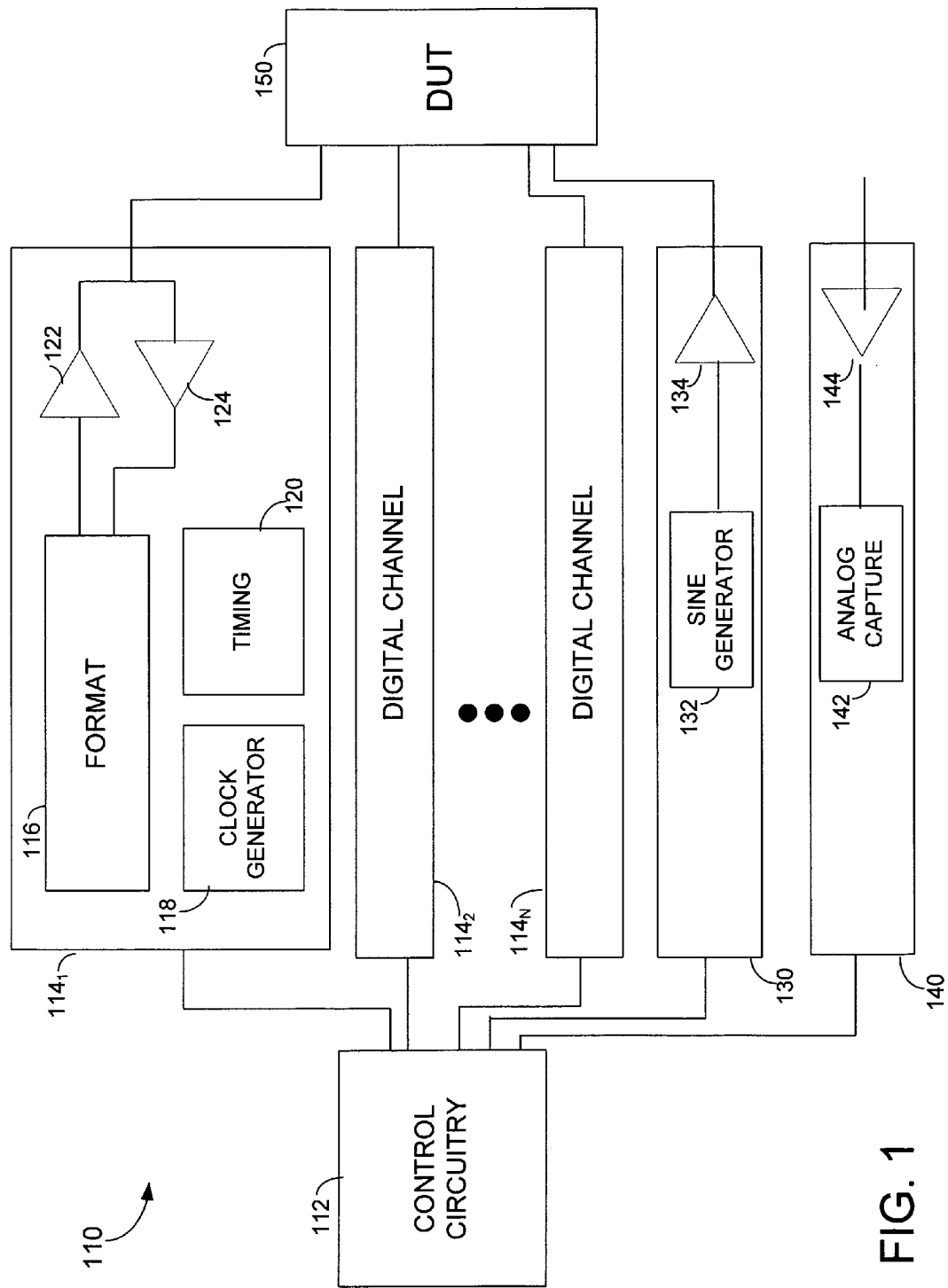
FIG. 1 is a block diagram of an automatic test system according to an embodiment of the invention.

FIG. 1 illustrates an automatic test system that may employ one or more sinusoidal signal generators according to an embodiment of the invention. Test system 110 includes control circuitry 112. Control circuitry 112 may include a computer work station or other device serving as a user interface. Through such a user interface, a user may program the system 110 to generate test signals that act as stimuli for device under test (DUT) 150 and to capture responses from DUT 150. Programming provided through control circuitry 112 may also specify the expected response to each stimulus signal or pattern of stimulus signals.

Control circuitry 112 may include a computer work station attached to a tester body operating in conjunction with control circuitry inside a tester body. The work station may be programmed to both control test system 110 to generate test signals and to analyze signals measured by test system 110. However, the implementation of control circuitry 112 is not critical to the invention and control circuitry 112 may be implemented as in a conventional test system or in any other suitable way.

Control circuitry 112 may control multiple circuits that generate signals applied to DUT 150 and/or measure signals output by DUT 150. In the illustrated embodiment, test system 110 may generate and/or measure both digital and analog signals.

Digital channel circuits $114_1$, $114_2$ ... $114_N$ may be programmed to generate digital test signals according to a programmed stimulus pattern. Digital channel circuitry $114_1$, $114_2$ ... $114_N$ may also be programmed to measure digital signals output by DUT 150 and determine whether DUT 150 responds as expected to an applied stimulus. Each digital channel circuit $114_1$, ... $114_N$ generates or measures a digital test signal for one test point on DUT 150 at a time. Because DUT 150 may contain numerous test points, test system 110 may include multiple digital channel circuits.

Taking digital channel circuit $114_1$ as illustrative, each of the digital channel circuits includes subcircuits to generate or measure a digital test signal according to a programmed pattern. Operation of digital channel circuit $114_1$ is timed by one or more clocks generated by clock generator 118. The frequency of clocks generated by clock generator 118 may be programmed so that digital channel circuit $114_1$ may generate test signals of desired frequencies at desired times.

Timing generator 120 uses the clocks generated by clock generator 118 to generate one or more timing signals that control operation of other components within digital channel circuit $114_1$. In the embodiment shown in FIG. 1, digital channel circuit $114_1$ includes a format circuit 116. Format circuit 116 uses timing signals generated by timing generator 120 to format a waveform that is applied through driver 122 to a test point on DUT 150. For example, format circuit 116 may generate signals that transition state, such as from a logical high state to a logical low state, at times controlled by timing signals from timing generator 120.

For measuring an output from DUT 150, signals from timing generator 120 may control the time at which comparator 124 samples the output of a test point on DUT 150. For example, format circuit 116 may read the output of comparator 124 and compare it to a programmed expected value to determine whether DUT 150 output a value as expected at a time controlled by timing signals generated by timing generator 120.

The components of digital channel circuit $114_1$ may generally be implemented using components as in a conventional test system or any other suitable components. However, in the embodiment illustrated, clock generator 118 includes one or more sinusoidal signal generators according to an embodiment of the invention.

Such a sinusoidal signal generator may be used to generate a sinusoidal signal of a programmed frequency. The sinusoidal signal may be used to derive a clock of the same frequency. For example, the sinusoidal signal may be amplified in a very high gain amplifier to produce a signal resembling a traditional square wave frequently used as a clocking signal in electronic equipment. For a signal generated in this fashion to result in an accurate clock signal, the sinusoidal signal preferably has low distortion because distortion of the sinusoidal signal may translate into inaccuracies in the timing signals generated based on the clock.

Automatic test system 110 also includes one or more analog channels for generating or measuring analog signals. In the embodiment of FIG. 1, test system 110 is shown with an analog channel 130 to generate an analog signal. In the embodiment illustrated in FIG. 1, analog channel 130 generates an analog test signal, which is illustrated to be a sine wave of programmable frequency. Accordingly, analog channel 130 is shown to include a sine wave generator 132 that is coupled to a driver 134. Driver 134 is in turn coupled to a test point on DUT 150 and supplies as a test signal the sine wave generated by sine wave generator 132.

Analog channel 140 can capture an analog signal for analysis. In the illustrated embodiment, analog channel 140 includes a receiver 144, which acts as a signal buffer and conditioner. Analog channel 140 also includes an analog capture circuit 142. Analog capture circuit 142 can sample a signal buffered by receiver 144 for processing within control circuitry 112 or other components within automat test system 110. The timing of those samples may be controlled by a clock derived from a sinusoidal signal generator.

Though switching circuitry is not expressly shown, such circuitry may be included to couple each of the analog and digital channels to a test point on DUT 150 or other signals, automatic test system 110 may include such switching circuitry. Switching circuitry coupled to analog channel 140 may allow analog channel 140 to measure a signal generated by DUT 150 as part of a test. Additionally, such switching circuitry could allow analog channel 140 to be connected to other analog or digital channels of test system 110 to measure signals generated by those channels for calibration or other purposes.

FIG. 1 shows two analog channels for simplicity of illustration. A test system according to an embodiment of the invention may have any number of analog channels that generate and/or measure analog test signals. Analog channels that perform different or additional functions may be incorporated into tester 110. Such different or additional channels may also incorporate programmable sine wave generators to generate sinusoidal signals for application to DUT 150 or to otherwise control some aspect of a test of DUT 150.

Figure 2:
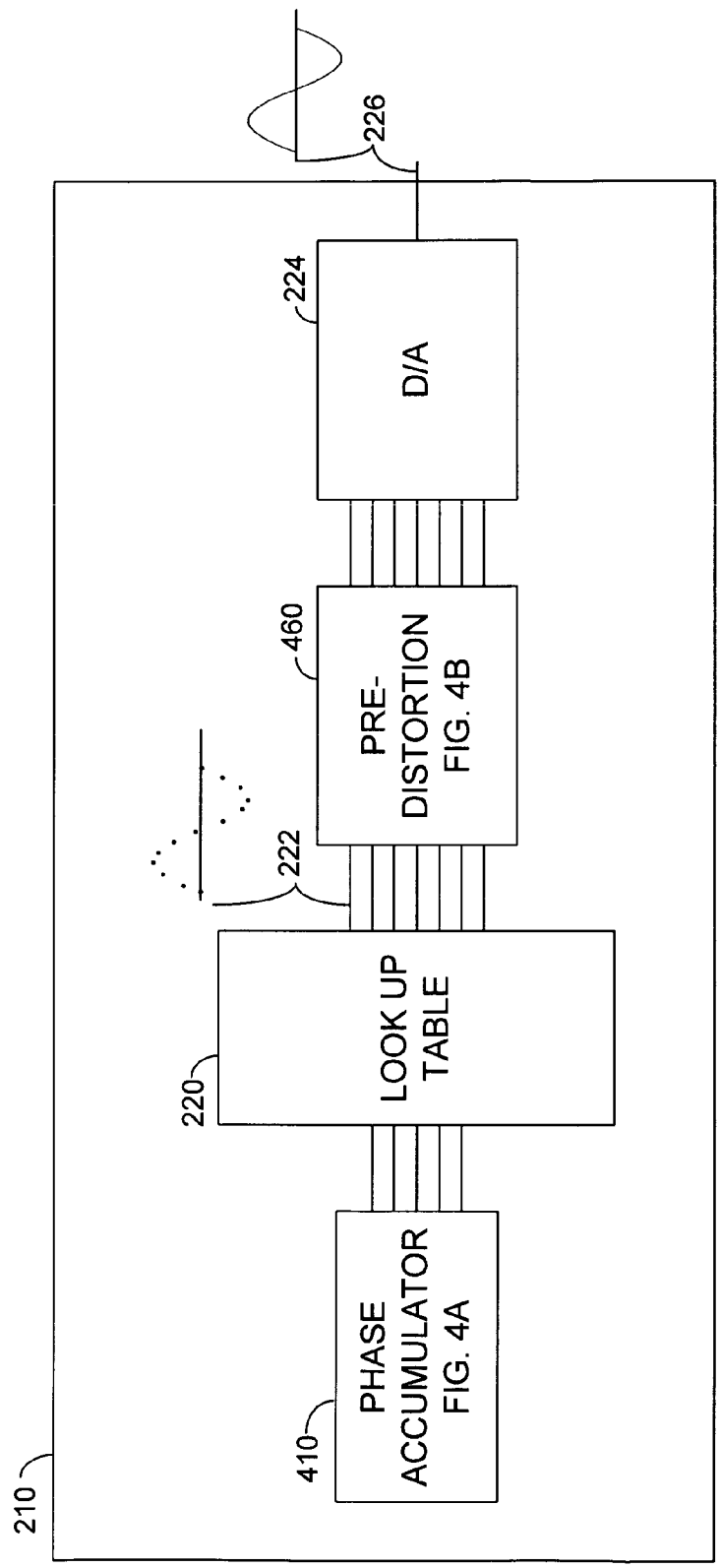
FIG. 2 is a block diagram of a sinusoidal signal generator according to an embodiment of the invention.

As can be seen from the sketch of automatic test system 110 in FIG. 1, an automatic test system may include multiple circuits that generate sine waves of programmable frequency. FIG. 2 illustrates sine wave generator 210 that may be used to generate some or all of the sinusoidal signals within tester 110. Sine wave generator 210 may be used to generate a sine wave of programmable frequency and may be used in either a digital channel, such as digital channel $114_1$, or an analog channel, such as analog channels 130 or 140, or in any other location within an automatic test system.

Sine wave generator 210 includes a look-up table 220. Look-up table 220 may be implemented in one or more memories that store digital values representing points on a sine wave. The values are stored in look-up table 220 at addresses correlated to the phase of the sine wave at which the value occurs. Accordingly, when look-up table 220 is addressed with a value representing a phase on the sine wave, it outputs the value of the sine wave at that phase.

Addresses to look-up table 220 are generated by phase accumulator 410. As in a conventional DDS circuit, phase accumulator 410 outputs a series of addresses that successively increase by a phase increment. The increase is computed using modular arithmetic so that, if increasing the value in phase accumulator 410 would result in a phase beyond the end of one cycle of the sine wave, phase accumulator 410 computes a phase that is the same amount beyond the start of a cycle of the sine wave as the incremented phase exceeds the end of that cycle.

In response to this series of addresses, look-up table 220 generates an output 222 that is a sequence of digital values that vary in a sinusoidal pattern. The frequency of variation of that pattern depends on the phase increment used by phase accumulator 410. Thus, by programming the phase increment, the frequency of the sine wave output from look-up table 220 may be programmed.

The digital values at output 222 are coupled to digital to analog converter (D/A) 224. D/A 224 converts the series of digital values into an analog signal at its output 226. In an ideal digital to analog converter, the analog signal at output 226 would be a perfect sine wave if the series of digital values at its input represented a perfect sine wave. However, practical implementations of digital to analog converters are not perfectly linear in their operation. Accordingly, each digital to analog converter introduces some amount of nonlinearity error. When generating a sine wave, nonlinearity error introduced by a digital to analog converter appears as distortion in the analog signal at output 226.

To reduce the amount of nonlinearity error introduced by D/A 224, and therefore the amount of distortion, predistortion circuit 460 may be connected between look-up table 220 and D/A 224. Predistortion circuit 460 includes look-up tables that may be programmed with values representative of the nonlinearity error introduced by D/A 224. These values may be subtracted from the values in the stream of values at output 222 to offset errors introduced by D/A 224. When the output of predistortion circuit 460 is applied to D/A 224, the distortion subtracted by predistortion circuit 460 offsets the distortion added by conversion in D/A 224. Accordingly, output 226 more accurately resembles a pure sine wave with less distortion.

In the embodiment of FIG. 2, predistortion circuit 460 compensates only for nonlinearity errors introduced in D/A 224. In other embodiments, predistortion circuit 460 may also compensate for other sources of nonlinearity error, including errors introduced because the values stored in look-up table 220 do not describe a perfect sine wave.

Figure 3:
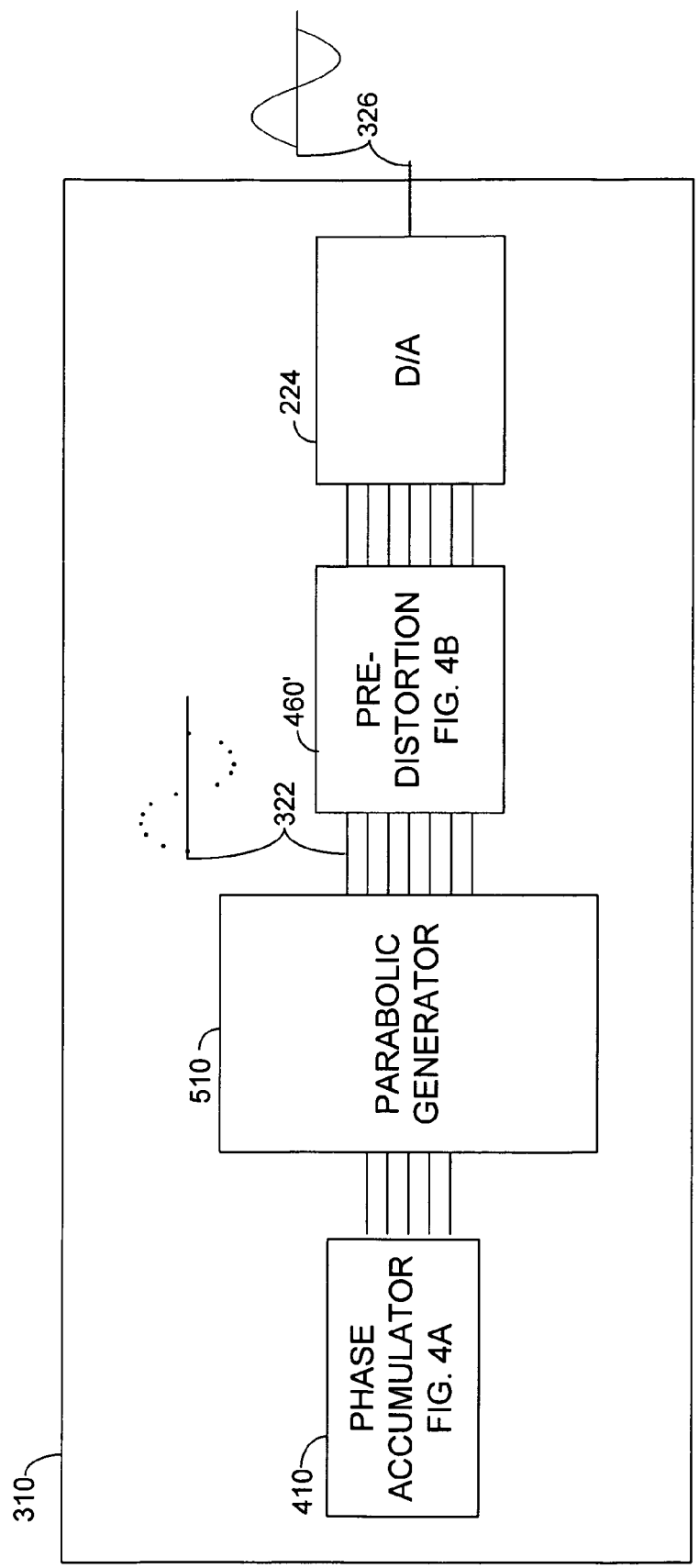
FIG. 3 is a block diagram of a sinusoidal signal generator according to an embodiment of the invention.

In the embodiment of FIG. 2, sinusoidal signal generator 210 uses look-up tables in two ways. Look-up table 220 is used to store a representation of a sine wave. Look-up tables are also used in predistoration circuit 460 to store correction factors. In some embodiments, it may be desirable to reduce the amount of memory used in implementing a sinusoidal signal generator. FIG. 3 shows a sinusoidal signal generator 310 that uses fewer look-up tables and may therefore be implemented in circuitry with less memory.

As with sinusoidal signal generator 210 (FIG. 2), sinusoidal signal generator 310 includes a phase accumulator 410 that may be programmed with a phase increment to control the frequency of the sine wave produced at output 326. As with sinusoidal signal generator 210, output 326 is generated by D/A 224. Also as with sinusoidal signal generator 210, the digital inputs to D/A 224 are predistorted. In the embodiment of FIG. 3, predistortion is provided in predistortion circuit 460'.

Predistortion circuit 460' may be a circuit having the same topology as predistortion circuit 460 (FIG. 2). However, the input to predistortion circuit 460' is different from the input to predistortion circuit 460. Accordingly, the correction factors applied in predistortion circuit 460' may be different than those applied in predistortion circuit 460. As described in greater detail below in connection with FIG. 4B, predistortion circuit 460 computes correction factors by reading look-up tables implemented in computer memory.

Accordingly, predistortion circuit 460' may differ from predistortion circuit 460 in the specific values stored in the look-up tables contained within predistortion circuit 460'. In sinusoidal signal generator 310, predistortion circuit 460' stores values that correct both for distortion introduced in D/A 224 and for distortion introduced by differences between output 322 and a sine wave.

In sinusoidal signal generator 310, output 322 is intended only as an approximation for a sine wave. As a result, differences between output 322 and a sine wave are greater than differences between output 222 and a sine wave. As a result, there may be a greater benefit to compensating for distortion introduced by differences between output 322 and a sine wave in sinusoidal signal generator 310 than would result from compensating for distortion introduced by differences between output 222 and a sine wave in sinusoidal signal generator 210 (FIG. 2).

An approximation for a sine wave is generated in sinusoidal signal generator 310 using parabolic generator 510 in place of look-up table 220 (FIG. 2). Rather than read values describing a sine wave from a look-up table, parabolic generator 510 computes values that approximate a sine wave. In the embodiment pictured in FIG. 3, parabolic generator 510 may compute an approximation to the value of a sine wave for any phase specified by phase accumulator 410 using a parabolic function. However, any suitable method for approximating a sine wave may be used.

Though parabolic generator 510 introduces inaccuracies because output 322 does not represent a sine wave, these inaccuracies need not influence the accuracy with which output 326 represents a sine wave. The inaccuracies in output 322 may be corrected in predistoration circuit 460' at the same time that inaccuracies introduced by D/A 224 are corrected. This correction may be achieved by measuring, during a calibration routine, distortion caused both by non-linearity error introduced in D/A 224 and distortion introduced because output 322 is only an approximation of a sine wave. A method of determining calibration coefficients for predistortion circuit 460 or 460' is described below.

Figures 4A, 4B:
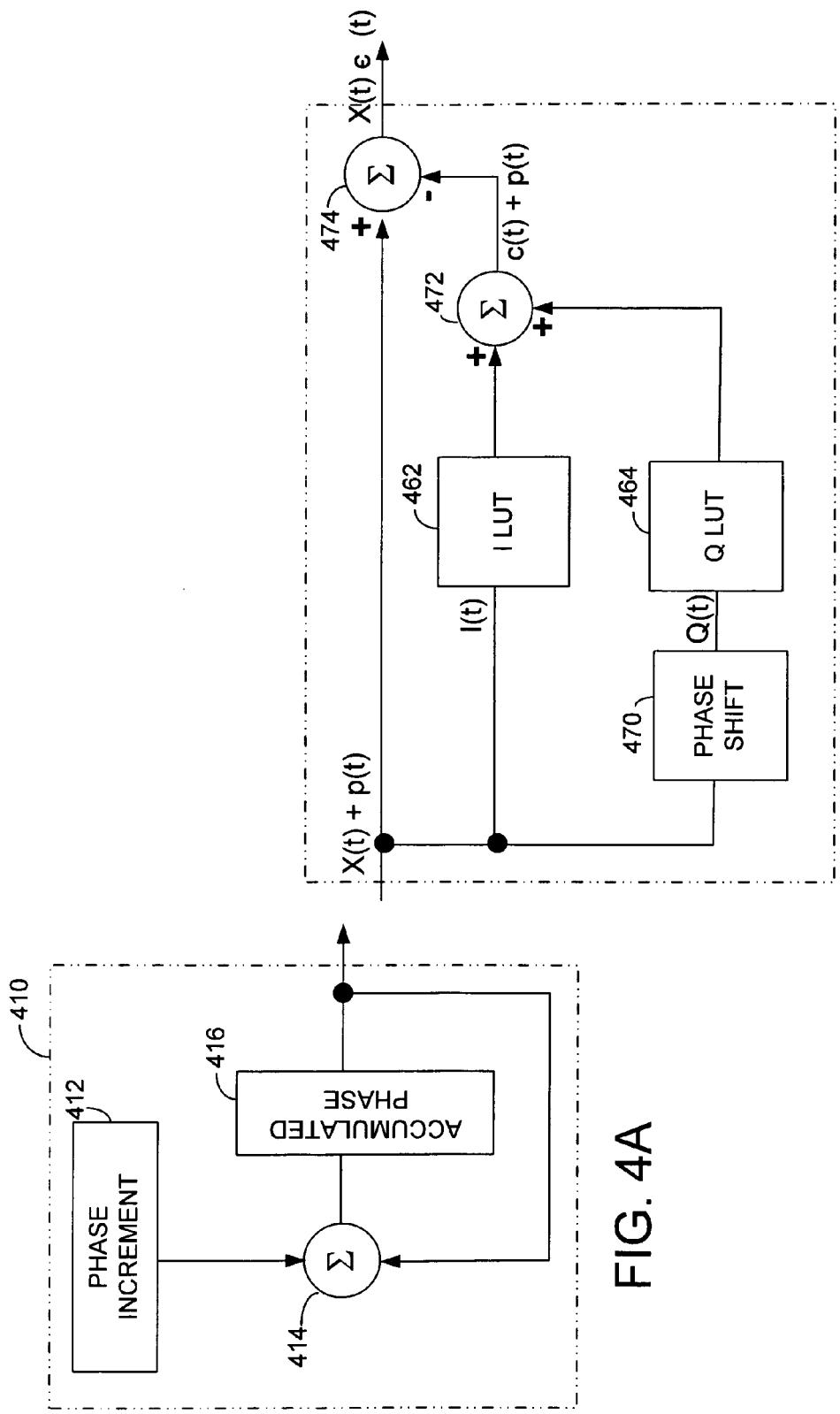
FIG. 4A is a block diagram of a phase accumulator that may be used in a sinusoidal signal generator according to an embodiment of the invention.
FIG. 4B is a block diagram of a predistortion circuit that may be used in a sinusoidal signal generator according to an embodiment of the invention.
Figure 5:
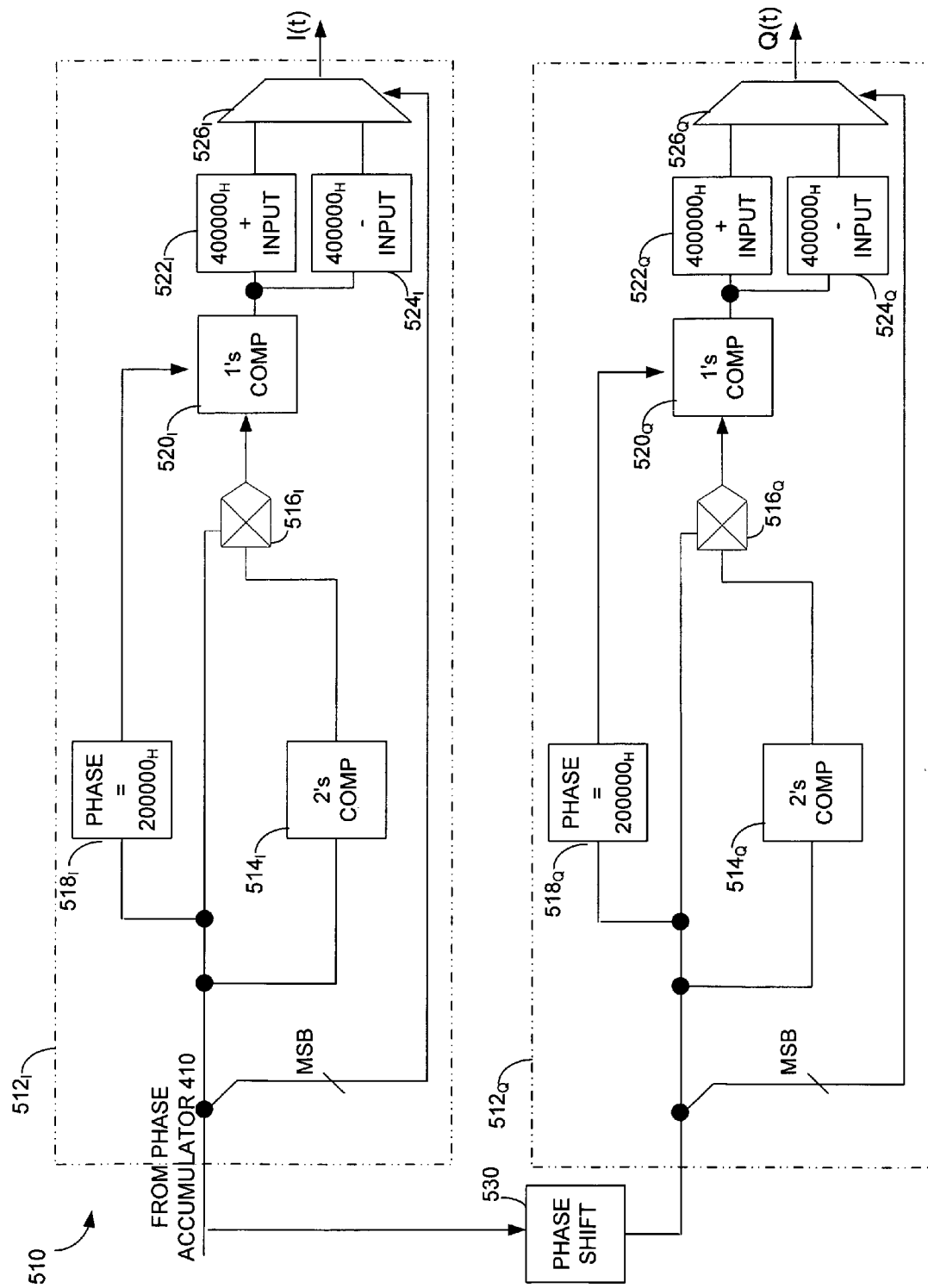
FIG. 5 is a sketch of a parabolic signal generator that may be used in a sinusoidal signal generator according to an embodiment of the invention.

Sinusoidal signal generator 310, like sinusoidal signal generator 210, may be implemented in any suitable way. As one example, the components of sinusoidal signal generators 210 and 310 may be implemented on semiconductor integrated circuits. FIGS. 4A, 4B and 5 provide examples of circuit configurations that may be used to implement the components of a sinusoidal signal generator in a semiconductor integrated circuit, or in any other suitable way.

FIG. 4A provides an example of circuitry that may be used to implement phase accumulator 410. As shown in FIG. 4A, phase accumulator 410 includes a register 416 that stores a value representing an accumulated phase. Register 416 stores a value having N bits. The number of bits in register 416 is not critical to the invention and any suitable number of bits may be used. Regardless of the number of bits in register 416, the value stored in register 416 is interpreted as a phase value of a point in one cycle of a sine wave. For each period of operation of phase accumulator 410, the stored value in register 416 is incremented by a phase increment stored in register 412.

Though not expressly shown, the value in phase increment register 412 may be programmed, such as by control circuitry 112 (FIG. 1). In the illustrated embodiment, the frequency of the output generated by sinusoidal signal generator using a phase accumulator 410 may be programmed by programming the phase increment value stored in register 412.

Phase accumulator 410 includes an adder 414. For each period of operation of phase accumulator 410, the value previously stored in accumulated phase register 416 is incremented by the value stored in phase increment register 412. The output of adder 414 is then stored in accumulated phase register 416 as the new accumulated phase.

If the values at the input of adder 414 sum to a value that requires more bits to represent than can be stored in accumulated phase register 416, the most significant bits of the sum may be simply discarded. Discarding the most significant bits results in the value stored in accumulated phase register 416 increasing in the same way as using modular arithmetic to add the phase increment to the accumulated phase. Because the output of phase accumulator 410 is used to address points on one cycle of a sine wave, discarding the most significant bits of the sum results in values representing a phase beyond the end of that cycle to be converted to values beyond the beginning of the cycle by the same amount that the values exceed the end of the cycle. Thus, the circuit of FIG. 4A may be used to generate a series of phase values that repeats cyclically as desired. However, any suitable technique for generating a phase signal may be used.

FIG. 4B illustrates an embodiment of circuitry that may be used to implement predistortion circuit 460. Predistortion circuit 460 includes two look-up tables, I look-up table 462 and Q look-up table 464. Each of the look-up tables 462 and 464 may be implemented in computer memory or in any other suitable way. The values stored in each of the look-up tables 462 and 464 may be determined during a calibration routine. An example of a suitable calibration routine is described below. Briefly, the calibration routine determines in-phase and quadrature phase correction values. These correction values are stored separately in I look-up table 462 and Q look-up table, 464, respectively, When a signal to be predistorted is applied at the input of predistortion circuit 460, that signal is used to address I look-up table 462. The input signal is shifted approximately 90° in phase shifter 470 to produce quadrature signal, Q(t). Q(t) is used to address Q look-up table 464. For each sample of the input signal, an I correction value and a Q correction value are read from I look-up table 462 and Q look-up table 464, respectively. These correction factors are summed at adder 472. The sum of the I and Q correction factors is subtracted from the input signal at adder 474 to produce a predistorted signal at the output of predistortion circuit 460.

In sinusoidal signal generator 310 (FIG. 3), output 322 of parabolic generator 510 can be represented as X(t), the desired output signal, plus a distortion amount, denoted in FIG. 4B as p(t). The function p(t) represents error introduced because output 322 is derived from a parabolic approximation to a sine wave rather than a representation of a sine wave. The error introduced in D/A converter 224 may be represented as c(t).

The coefficients stored in I look-up table 462 and Q look-up table 464 collectively represent nonlinearity errors introduced as a result of the conversion in D/A 224 and introduced because output 322 is not exactly sinusoidal. Accordingly, the output of adder 472 can be represented c(t)+p(t), representing the combination of error introduced by approximating a sine wave by a parabolic function, p(t), and the error introduced by D/A converter 224, c(t). When this value is subtracted from the input in adder 474, the resulting output can be represented as X(t)−c(t). Thus, some of the output of predistortion circuitry 460 removes the errors introduced by representing a sine wave at output 322 by a parabolic function, while simultaneously predistorting the value to be applied to D/A 224 by an amount that compensates for distortion that will be introduced when conversion is performed in D/A 224.

Turning to FIG. 5, an example of a circuit that may be used to compute an approximation to a sinusoidal signal is illustrated. FIG. 5 illustrates an implementation in which a parabolic function is used to approximate a sine wave.

In the embodiment illustrated, parabolic signal generator 510 includes a subcircuit 512$_I$ and a subcircuit 512$_Q$. Subcircuits 512$_I$ and subcircuit 512$_Q$ have the same configuration, but process different data to generate an in-phase and a quadrature phase component representing a sine wave. The input of parabolic signal generator 510 is coupled as an input to subcircuit 512$_I$. That same input value is coupled through phase shifter 530 to the input of subcircuit 512$_Q$. In the embodiment illustrated, phase shifter 530 may be a 90° phase shift circuit implemented in any suitable way.

Because subcircuit 512$_I$ and subcircuit 512$_Q$ may have the same configuration, the operation of only subcircuit 512$_I$ is described. Though in other embodiments, subcircuit 512$_I$ and subcircuit 512$_Q$ may have different configurations.

Subcircuit 512$_I$ may take advantage of symmetry associated with a sine wave to simplify the circuitry required to generate values for a full cycle of a sine wave. A sine wave may be regarded as having four quadrants. The first quadrant spans phase values between 0 and 90°. The second quadrant spans phase values between 90° and 180°. The third quadrant spans phase values between 180° and 270° and the fourth quadrant spans phase values between 270° and 360°.

The quadrants relate to the phase values output by phase accumulator 410. Values between 0 and one-quarter of the full-scale value at the output of phase accumulator 410 are in the first quadrant. Values between one-quarter and one-half of the full-scale value at the output of phase accumulator 410 are in the second quadrant. The third and fourth quadrants correspond to values between one-half of the full-scale value and the full-scale value at the output of phase accumulator 410. Accordingly, the quadrant in which a phase value falls may be identified by the two most significant bits of the phase value output by phase accumulator 410.

Because of the symmetry of a sine wave, values of the sine wave in quadrants two, three and four can be derived from values in the first quadrant. The values in the second quadrant are the mirror image of the values in the first quadrant, decreasing as phase increases in contrast to values in the first quadrant that increase as phase increases. Values in the third and fourth quadrants can be determined as the negative of corresponding values in the first and second quadrants.

To take advantage of this symmetry, subcircuit 512$_I$ includes circuitry that may identify the quadrant associated with a phase value at its input. Computation is performed based on all but the most significant bit of a phase for which a value is to be generated—which results in the same value being computed for a phase in the first half cycle of the sine wave as in the second half. An appropriate correction can later be supplied to make the values in the second half of the cycle negative.

The bulk of the computation within subcircuit 512$_I$ is performed in multiplier 516$_I$. Multiplier 516$_I$ receives as an input all but the most significant bit of a phase for which a value is to be generated. The second multiplicand is the 2's compliment of the first input and is generated in 2's compliment circuit 514$_I$.

How the output of multiplier 516$_I$ is used depends on the quadrant in which the value falls. If the value is in the first quadrant, the most significant bits of the product computed in multiplier 516$_I$ represent the amount that the approximate value of the sine wave exceeds zero. If the value is in the second quadrant, the most significant bits represents the amount that the approximate value is less than the full scale value. For values in the third and fourth quadrants, the value is the negative of the value that would be computed if the value were in the first or second quadrant, respectively.

To convert the computed value based on quadrant, the most significant bits at the output of multiplier 516$_I$ are first passed to 1's compliment circuit 520$_I$. In the illustrated embodiment, 23 bits may be passed to 1's compliment circuit 520$_I$. 1's compliment circuit 520$_I$ selectively forms the one's compliment of the output of multiplier 516$_I$.

Whether 1's complement circuit 520$_I$ forms the 1's complement at its input depends on the quadrant in which the value falls. The 1's complement is computed for values in the second and fourth quadrants. Values in the first and third quadrants pass through 1's compliment circuit 520$_I$ without being complemented. To selectively complement the output of multiplier 516$_I$ as desired, 1's compliment circuit 520$_I$ is enabled with the output of comparator 518$_I$.

In the embodiment illustrated, the output of phase accumulator 410 is 23 bits long. Accordingly, a value of 200,000$_H$ identifies one-quarter of the full-scale value. By comparing the input phase using a mask of 200,000$_H$, comparator 518$_I$ determines whether the input phase specifies a value in the second or fourth quadrant of the sine wave. If the phase has logical 1's in bit positions matching the logical 1's in 200,000$_H$, the output of comparator 518$_I$ is asserted, indicating a phase in the second or fourth quadrant.

To produce values in quadrants two and four that decrease in proportion to phase, the 1's complement of the value output by multiplier 516$_I$ may be computed for values in those quadrants. Because the output of comparator 518$_I$ is provided as an enable input to 1's compliment circuit 520$_I$, 1's compliment circuit 520$_I$ complements the output of multiplier 516$_I$ for values in the second or fourth quadrant.

The value output by 1's compliment circuit 520$_I$ represents the amount that the output of subcircuit 512$_I$ should exceed zero for phases in quadrants one and two. For phases in quadrants three and four, the value output by 1's compliment circuit 520$_I$ represents the amount that the output of subcircuit 512$_I$ should be less than zero. To produce a value output by subcircuit 512$_I$ having the desired characteristics, the value output by 1's compliment circuit 520$_I$ is applied in parallel to adder 522$_I$ and subtractor 525$_I$. Either the value output computed in adder 522$_I$ or subtractor 525$_I$ is selected as the output of subcircuit 512$_I$, depending on the quadrant of the input phase.

In the embodiment illustrated, the output of subcircuit 512$_I$ is represented in 24 bits. Accordingly, 800000$_H$ is the midpoint in the range of output values. Values above 800000$_H$ may be regarded as positive. Values below 800000$_H$ may be regarded as negative. In adder 522$_I$, the value output by 1's compliment circuit 520$_I$ is added to 800,000$_H$ to represent a positive value, such as occurs in the first and second quadrants of a sine wave. Conversely, substractor 524$_I$ subtracts the value output by 1's compliment circuit 520$_I$ from 800,000$_H$ to represent a negative value, such as occurs in the third and fourth quadrants of a sine wave.

Multiplexer 526$_I$ selects as the actual output value either the value output by adder 522$_I$ or subtractor 525$_I$, depending on whether the input phase value represents a phase in either quadrants one or two of the sine wave or a phase in quadrants three or four of the sine wave, respectively. Because phase values in either quadrant one or two of the sine wave have a most significant bit of 0 and phase values in the third and fourth quadrants of the sine wave have a most significant bit value of 1, the most significant bit value of the value from phase accumulator 410 may be used to select between outputs of adder $522_I$ and subtractor $524_I$. Accordingly, the most significant bit of the input phase is used as a select input to multiplexer $526_I$.

In operation, a series of phase values is output from phase accumulator 410 and applied as an input to parabolic signal generator 510. Though not expressly shown, the circuitry in FIG. 5 may be pipelined to reduce the average delay in computing values approximating the sine of the phase values in the input sequence.

Subcircuit $512_Q$ operates similarly to subcircuit $512_I$, except that the input to subcircuit $512_Q$ is shifted in phase by approximately 90 degrees. Otherwise, the components of subcircuit $512_Q$ may have the same structure and function as corresponding components in subcircuit $512_I$. For example, 2's complement circuit $514_Q$ may have the same structure and function as 2's complement circuit $514_I$. Likewise, multiplier $516_Q$, comparator $518_Q$, 1's complement circuit $520_Q$, adder $522_Q$, subtractor $524_Q$ and multiplexer $526_Q$ may have a structure and function similar to that of multiplier $516_I$, comparator $518_I$, 1's complement circuit $520_I$, adder $522_I$, subtractor $524_I$ and multiplexer $526_I$, respectively.

By computing both an I and a Q component of the parabolic signal, the outputs of parabolic signal generator 510 may be applied to downstream circuitry that operates on both an I and a Q component. For example, FIG. 4B shows that predistortion circuit 460 receives an input I(t) as an input to I-look-up table 462 and a value Q(t) as an input to Q-look-up table 464. In embodiments in which parabolic signal generator 510 is used in conjunction with a predistortion circuit 460, the output of subcircuit $512_I$ may be coupled to the input I look-up table 462 and the output subcircuit $512_Q$ may be coupled to the input of Q look-up table 464.

Regardless of how the values output by parabolic signal generator 510 are used, FIG. 5 illustrates that the outputs may be computed without using a look-up table. Each of the major components of parabolic signal generator 510 may be implemented using digital logic circuits. Accordingly, sine wave generator 310 may be implemented in semiconductor chips containing digital logic, even if those semiconductor chips do not contain large amounts of memory needed for look-up tables. Implementing a sine wave generator in digital logic may be particularly desirable in the context of an automatic test system that includes multiple sine wave generators. For example, automatic test system 110 may include one or more sine wave generators within clock generator 118 within each digital channel, such as digital channel $114_1 \ldots 114_N$. Likewise, one or more sine wave generators may be implemented in each analog channel.

Figure 6:
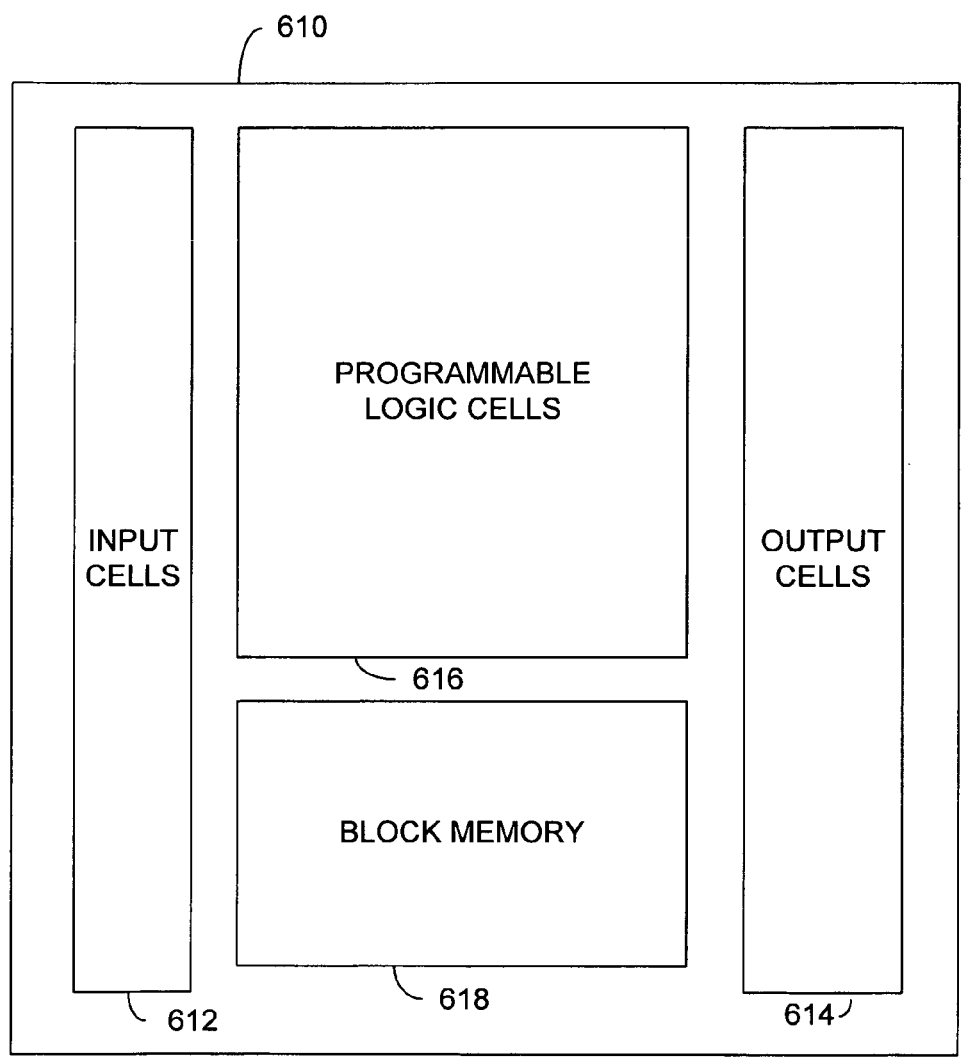
FIG. 6 is a block diagram of a field programmable gate array that may be used in implementing a sinusoidal signal generator according to an embodiment of the invention.

As one example, one or more sinusoidal signal generators may be implemented in a programmable logic device. FIG. 6 illustrates an integrated circuit chip suitable for use in implementing one or more sinusoidal signal generators, such as sine wave generator 310.

Field programmable gate array 610 includes input cells 612, output cells 614, programmable logic cells 616 and block memory 618. Programmable logic cells 616 and block memory 618 may be configured to implement one or more functions performed on input signals applied to input cells 612 to generate output signals at the output cells 614.

Field programmable gate array 610 may be programmed to perform multiple functions. However, the functions programmed in field programmable gate array collectively cannot require more programmable logic cells than are contained within programmable logic cells 616. Likewise, the functions implemented in field programmable date array 610 collectively cannot require more memory than is contained within block memory 618. If either more logic cells or more memory is required to implement a set of functions, additional semiconductor chips must be added to the test system to provide circuitry that supports the required functions.

Sinusoidal signal generator 310 has an architecture that is well suited for implementation in a programmable logic device, such as field programmable gate array 610, that includes configurable logic and some memory. Phase accumulator 410 and parabolic generator 510 may be implemented using programmable logic cells 616. The logic portions of predistortion circuit 460' may also be implemented in programmable logic cells 616. The look-up tables within predistortion circuit 460' may be implemented in block memory 618.

If sinusoidal signal generator 310 required further block memory to also store a sine wave look-up table, the amount of memory in block memory 618 may be inadequate to implement all functions of a sinusoidal signal generator or a number of sinusoidal generators desired. In contrast, using block memory for storing the look-up tables in predistortion circuit 460' without storing separate sine wave look-up tables may lead to an efficient implementation of a sinusoidal signal generator. Consequently, embodiments generating a digital representation of a sinusoidal signal using a look-up table may require more semiconductor devices or devices with more memory. Because either possibility can cause an undesirable increase in the cost and/or size of a test system, in many embodiments, it may be preferable to implement a sinusoidal signal generator as depicted in FIG. 3 in which an approximation to a sine wave is computed rather than generated using a look-up table.

Figure 7:
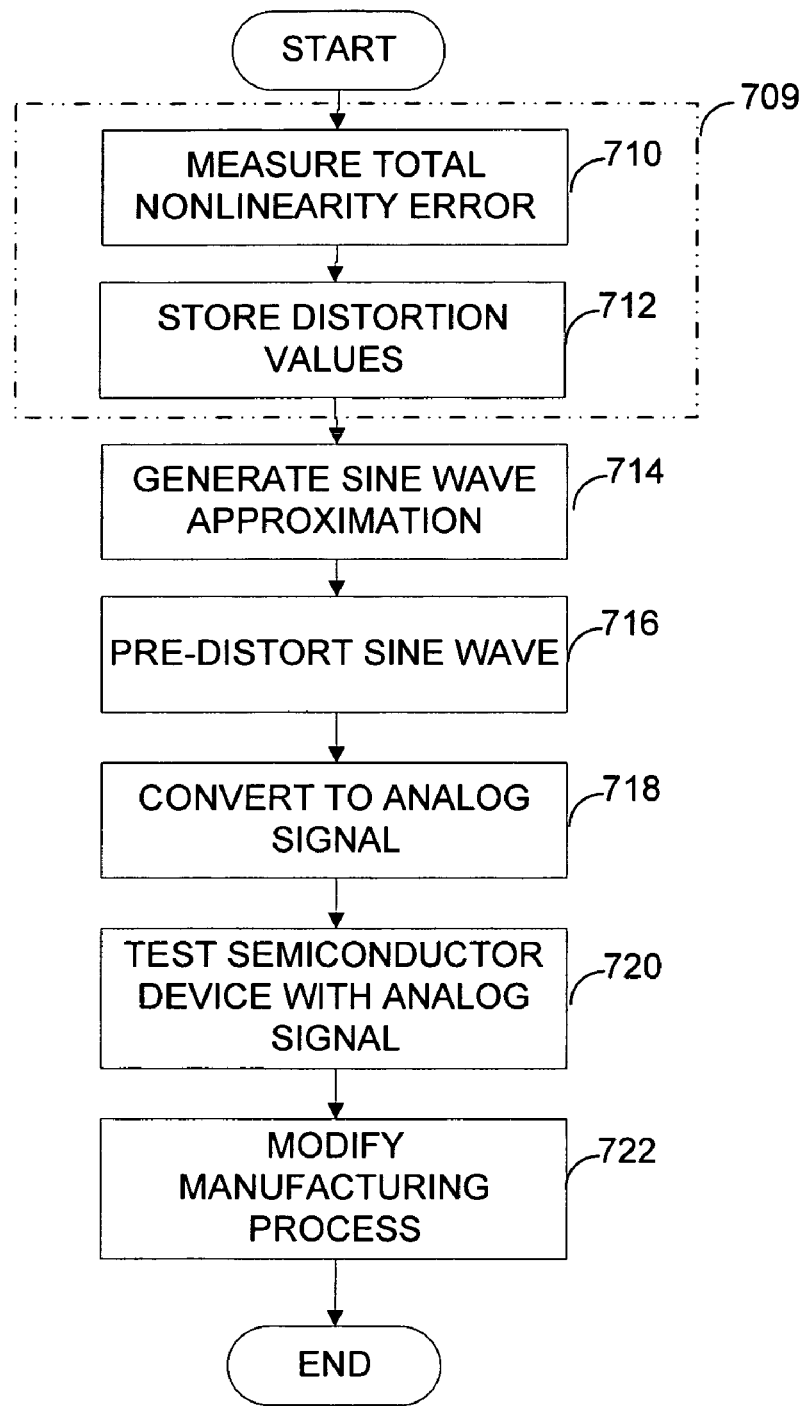
FIG. 7 is a flow chart of a process of manufacturing semiconductor devices according to an embodiment of the invention.

Turning to FIG. 7, processing to test semiconductor devices using an automatic test system including one or more sinusoidal signal generators as described above is illustrated. The process of FIG. 7 begins at block 710, which begins a calibration routine 709, which includes blocks 710 and 712. During calibration routine 709, correction factors stored in a predistortion circuit may be determined.

Calibration routine 709 may be performed at any suitable time in any suitable place. For example, calibration routine 709 may be performed as part of the manufacture of a test system and may be performed at a factory where the test system is manufactured. Alternatively, calibration may be performed when the test system is installed. As an example of a further alternative, calibration may be performed at a site where an automatic test system is used. For example, a calibration routine may be performed periodically, such as once each manufacturing shift.

At block 710, measurements are made from which a total non-linearity error of the sinusoidal signal generator can be determined. If the process of FIG. 7 is performed with a test system as shown in FIG. 1, measurements at block 710 may be made by coupling the output of analog channel 130, which includes a sinusoidal signal generator 132, to the input of analog channel 140. With this connection, the automatic test system 110 may obtain measurements of the actual signals generated when sine wave generator 134 is programmed to generate various sinusoidal signals. However, the precise mechanism by which a sinusoidal signal is measured is not a limitation of the invention and any suitable mechanism may be used. For example, separate test equipment used for calibration of automatic test equipment 110 may be connected to the output of any sinusoidal signal generator to make measurements of the actual outputs.

Regardless of how the measurements are made, those values may indicate the amount of distortion in the circuitry generating the sinusoidal signal. From these measurements, therefore, predistortion values that compensate for the total distortion may be computed and stored in the look-up tables within predistortion circuit 460'. An example of a process by which these values may be computed is provided below.

Regardless of how the stored distortion values are computed, processing then proceeds to block 714. At block 714, an approximation of a sine wave is generated. In a sinusoidal signal generator in the form of FIG. 3, the processing at block 714 may include applying a sequence of phase values to a parabolic generator circuit, such as parabolic generator circuit 510.

Regardless of how sine wave approximation is generated at block 714, the sine wave approximation signal is predistorted. Processing at block 716 may provide predistortion both to compensate for any differences between the sine wave approximation and an actual sine wave and to offset any errors introduced in other portions of the signal generation circuitry. In the example above, offset for errors associated with an analog-to-digital converter were described. However, the process of FIG. 7 may be used to offset errors introduced in any other component of a signal generator.

Once the sine wave approximation is predistorted, it is converted to an analog signal at block 718. The sine wave may then be used at block 720 to test a semiconductor device. The analog sine wave may be used in any suitable way during testing of a semiconductor device. For example, the sine wave may be applied directly to a semiconductor device as a stimulus signal. Alternatively, the sine wave may be used to generate one or more clocks of a programmed frequency.

Regardless of how the analog signal is used in the testing process, results of the testing process are used at block 722 to modify the manufacturing process. In some instances, the manufacturing process is modified for a single semiconductor device. For example, a test result may be used to modify the process flow for a device, with devices that do not exhibit the expected response being culled and discarded while those that do exhibit the expected result being passed to subsequent steps in the manufacturing operation.

In other instances, test results may be used to "bin" semiconductor devices. In binning parts, those devices that perform as expected in all test cases may be binned as fully functioning devices. In contrast, devices that perform as expected in some, but not all, instances may be binned as partially functioning devices. Partially functioning devices may be packaged, marked or otherwise identified as devices with degraded performance if they can perform enough functions correctly to be useful. Devices with degraded performance may be sold at a lower price than fully functioning devices. As a specific example, a microprocessor chip may be designed to operate at clock frequencies of 4 GHz. During testing, a processor that performs as expected when clocked at 4 GHz may be packaged and sold as 4 GHz processors. However, a processor that does not perform as expected at 4 GHz, but does perform as expected at 2 GHz, may be packaged and sold at a reduced price as a 2 GHz processor.

Similar binning may be performed on other types of chips, such as semiconductor devices with onboard memory. For example, a device, may be designed with 512 KB of onboard memory. If, upon testing, the results indicate that only 256 KB of memory is operational, the device may be binned for sale as a part with 256 KB of onboard memory.

In other instances, the results of testing a device may be used to control physical modifications of the part. For example, many devices containing memory are constructed with spare memory cells. If, upon testing, some memory cells are determined to be faulty, the structure of the device may be altered to disconnect the faulty memory cells and connect spare memory cells in their place. Semiconductor devices may be altered using a laser or electrical signals that make or break interconnections within the device.

In other instances, test results are used to alter the manufacturing process in a statistical sense. Results of testing numerous devices may be aggregated to identify failure patterns that indicate a misalignment or other problem at a manufacturing step. Based on this analysis, manufacturing equipment used to manufacture semiconductor devices may be adjusted so that fewer devices are manufactured with defects.

Example of Computation of Predistortion Factors

The Harmonic distortion d(t) may be modeled using a general Fourier Series expansion as follows:

$$d(t) = \sum_{n=2}^{N} H_n \cdot \cos(n \cdot \omega \cdot t + \theta_n), \quad (1)$$

where t refers to time, and where $H_n$ and $\theta_n$ are the magnitude and phase of an $n^{th}$ harmonic as measured by Fast Fourier Transform (FFT) processing of a sampled and quantized calibration test signal.

Any signal, such as d(t) in equation (1), can be separated into an orthogonal superposition of an even function and an odd function, as follows:

$$x(t)=x_E(t)+x_O(t),$$

where $x_E(t)=\frac{1}{2} \cdot [x(t)+x(-t)]$ and $x_O(t)=\frac{1}{2} \cdot [x(t)-x(-t)]$.

The Fourier transform of this resulting test signal, x(t), can be written using the following superposition $$X(\omega)=X_R(\omega)+j \cdot X_I(\omega)$$

where $X_R(\omega)$ and $X_I(\omega)$ are the real and imaginary parts of $X(\omega)$. A useful property of real-valued signals, exploited in the linearity correction process described herein, is Hermitian symmetry, i.e., that $X_R(\omega)$ and $X_I(\omega)$ are equivalent to the Fourier Transform of the even parts and the odd parts, respectively, of x(t).

Expanding equation (1) above into even and odd terms using trigonometric identities yields the following general expression for harmonic distortion:

$$d(t) = \sum_{n=2}^{N} H_n \cdot [\cos(\theta_n) \cdot \cos(n \cdot \omega \cdot t) - \sin(\theta_n) \cdot \sin(n \cdot \omega \cdot t)] \quad (2)$$

Because static non-linearity produces errors that depend only on the current amplitude (e.g., sample value) of the fundamental calibration signal, it follows that the error function produced by this non-linearity must have the same symmetry as the fundamental calibration signal. Choosing an even function for the fundamental calibration signal, such as a zero phase cosine, ensures that static nonlinearity produces distortion that is reflected completely in the real part of the FFT. In this case, with purely static non-linearity and no dynamic component, the distorted signal is an even function, the FFT is completely real-valued, and equation (2) reduces to $$d(t) = \sum_{n=2}^{N} H_n \cdot \cos(\theta_n) \cdot \cos(n \cdot \omega \cdot t) \qquad (3)$$

where $\theta_n = 0, \pi$ for all n.

If the fundamental calibration signal is even, any energy in the imaginary part of the FFT will be the result of an odd component in the harmonic distortion. Because this odd component to the harmonic has orthogonal symmetry to the fundamental calibration signal, the odd component must have originated from non-linearity with memory (i.e., dynamic non-linearity). Thus, dynamic non-linearity produces a component of the error signal (harmonic distortion) with orthogonal symmetry to the fundamental calibration signal, i.e., odd if the fundamental calibration signal is a cosine signal.

Static and dynamic non-linearity can be separated and measured independently using a combination of signal processing theory and Automatic Test Equipment (ATE) mixed-signal synchronization. If a calibrator uses a pattern to trigger an ATE capture instrument, such as analog capture instrument 140 (FIG. 1), at a peak of a sinusoid produced by an arbitrary waveform generator (AWG) source, such as analog instrument 130 (FIG. 1), then the calibrator can exploit the symmetry properties of the Fourier Transform to determine a distortion compensation function. In this case, the captured calibration test signal, y(t), has the form of a zero phase cosine with additive harmonic distortion d(t), such that:

$y(t) = \cos(\omega \cdot t) + d(t)$.

The error signal (d(t)) produced by a combination of static and dynamic non-linearity can be generated digitally using an orthogonal basis of sine and cosine functions. One implementation that uses a Hilbert Filter to generate the quadrature component of this basis in conjunction with look-up table (LUT) memories is shown in FIG. 4B.

More specifically, because the harmonic distortion signal is periodic and real valued, the harmonic distortion signal can be represented by a general Fourier Series with an orthogonal basis of sine and cosine functions using equation (2). Thus, it is possible to digitally reconstruct the harmonic distortion signal using two look-up tables: an "I-LUT" addressed with fundamental signal and a parallel "Q-LUT" addressed by quadrature signal generated with a 90° phase shift Hilbert filter. The reconstructed harmonic distortion signal may then be used to compensate the channel non-linearity by predistorting the input to a digital-to-analog converter (DAC).

Referring to FIG. 4B, static non-linearity is compensated using an "in-phase" look-up table (I-LUT) 462 to implement a memory-less (meaning that the value of function depends on the current input) correction function that depends solely on a current value of x(t) (the signal being corrected). Dynamic non-linearity is compensated using a combination of a 90° phase shift, which is substantially constant over a broad frequency range, followed by a memory-less "quadrature" look-up table (Q-LUT) 464. As shown in FIG. 4B, the error correction data outputs of I-LUT 462 and Q-LUT 464 are combined using an adder 472 to produce the error, d(t), which is then subtracted from the input signal. FIG. B.

Each individual LUT (I-LUT 462 and Q-LUT 464) implements a polynomial function, $f_{LUT}$, of its address, which is defined as follows:

$$f_{LUT}(x) = \sum_{n=2}^{N} a_n \cdot x^n$$

This polynomial describes a memory-less non-linearity (The non-linearity is "memory-less" in the sense that the value of the function does not depend on prior values.). The $n^{th}$ term of this non-linearity produces an $n^{th}$ harmonic in response to a sinusoidal input, x(t).

Using a zero phase cosine signal for the fundamental calibration signal, correction data for storage in the I-LUT can be determined from the real part of the calibration signal FFT, and similarly correction data for storage in the Q-LUT can be determined from the imaginary part of the calibration signal FFT. Determining the I-LUT correction data includes mapping the harmonic distortion from a function of time to a function of amplitude, given that the I-LUT is addressed by a current sample value (amplitude). The input to the I-LUT is the primary data stream given by $x(t) = \cos(\omega_0 \cdot t)$. For a particular amplitude of x, the time at which the sample occurred (within a first cycle) is given by the following:

$t = \omega_0^{-1} \cdot \cos^{-1}(x)$.

Substituting $\omega_0^{-1} \cdot \cos^{-1}(x)$ for the variable t in equation (3) above results in the following equation, which is used to determine the I-LUT correction data:

$$d_I(x) = \sum_{n=2}^{N} H_n \cdot \cos(\theta_n) \cdot \cos(n \cdot \cos^{-1}(x)) \qquad (4)$$

The Q-LUT is addressed by a quadrature (approximately 90°) phase shifted version of x(t), namely:

$x_q(t) = \cos(\omega_0 \cdot t - \pi/2) = \sin(\omega_0 \cdot t)$.

The time associated with a particular sample value at the input of the Q-LUT is defined by the following equation:

$t = \omega_0^{-1} \cdot \sin^{-1}(x)$.

Substituting $\omega_0^{-1} \cdot \sin^{-1}(x)$ for t in equation (2) results in the following equation for determining the Q-LUT correction data:

$$d_q(x) = -\sum_{n=2}^{N} H_n \cdot \sin(\theta_n) \cdot \sin(n \cdot \sin^{-1}(x)). \qquad (5)$$

Equations (4) and (5) provide closed-form solutions for determining correction data for use in correcting the first N harmonics produced by non-linearity in an ATE instrument channel. A process for determining table entries for an M-bit address LUT quantizes $x \in [-1,1]$ in $2^M$ values and determines corresponding error correction data using equations (4) and (5). It is noted that equations (4) and (5) are only valid if the harmonic amplitudes and phases result from FFT processing on a zero phase cosine fundamental calibration signal. Although patterned-controlled ATE signals can approximate a zero phase cosine fundamental calibration signal, in practice this can be time-consuming to achieve, and a residual phase error resulting from variability in delay through the instrument's analog signal path can limit signal correction. Allowing a non-zero phase for the fundamental calibration signal means that the calibration signal used to measure the harmonic amplitudes and phases has the form $$x(t)=\cos(\omega_0 \cdot t + \phi) \quad (6)$$

where $\phi$ is the arbitrary non-zero phase of the fundamental calibration signal. This more general approach is consistent with ATE capabilities and end-applications, where exact frequency ratios are achieved for coherency and typical FFT measurements are indifferent to the fundamental signal phase.

If $\phi$ is non-zero, the fundamental calibration signal contains both an even and odd component and, consequently, both static and dynamic non-linearity produce mixed-symmetry outputs. In order to use $H_n$ and $\theta_n$ to correctly load correction data in the look-up tables, it is necessary to create an orthogonal basis around the harmonic phase residual resulting from the dynamic linearity, i.e. $\theta_n$, with the contribution from $\phi$ removed. Recognizing that the $n^{th}$ term of the polynomial describing the memory-less, non-linear system produces an $n^{th}$ harmonic in response to $x(t)$, and rotates the phase of $x(t)$ by $n \cdot \phi$, the harmonic distortion in an instrument channel can be modeled as $$d(t) = \sum_{n=2}^{N} H_n \cdot \cos(n \cdot \omega_0 \cdot t + n \cdot \phi + \theta_n - n \cdot \phi).$$

Expanding the above equation onto an orthogonal basis of sine and cosine functions results in the following:

$$d(t) = \sum_{n=2}^{N} H_n \cdot [\cos(\theta_n - n \cdot \phi) \cdot \cos(n \cdot \omega_0 \cdot t + n \cdot \phi) - \sin(\theta_n - n \cdot \phi) \cdot \sin(n \cdot \omega_0 \cdot t + n \cdot \phi)].$$

If the channel non-linearity is purely static, then $\theta_n - n\phi = 0, \pi$ and the sine component above is zero. Thus, each cosine term of the above expression is "in-phase" with the fundamental signal, i.e., each harmonic term angle is rotated by n, which is the expected response due the $n^{th}$ order component to static non-linearity in the channel. In contrast, the sine term involves both rotation by n and a quadrature (i.e., approximately 90°) phase shift from the fundamental signal.

Thus, the I-LUT error correction data is determined from the in-phase distortion by mapping from the time domain to the amplitude domain at an input to the I-LUT, as follows:

$$t = \omega_0^{-1}(\cos^{-1} x - \phi).$$

Substituting $\omega_0^{-1} \cdot (\cos^{-1} x - \phi)$ for t in the "in-phase" term for d(t) provides the following closed-form equation for determining the I-LUT error correction data.

$$d_I(x) = \sum_{n=2}^{N} H_n \cdot \cos(\theta_n - n\phi) \cdot \cos(n \cdot \cos^{-1}(x)) \quad (7)$$

The relationship between a sample value and the time at which the sample occurred (in a first cycle) at the input to the Q-LUT is given by $$t = \omega_0^{-1} \cdot (\sin^{-1} x - \phi)$$

Substituting $\omega_0^{-1} \cdot (\sin^{-1} x - \phi)$ for t in the "quadrature" term for d(t) above results the following closed-form solution for determining the Q-LUT error correction data.

$$d_Q(x) = -\sum_{n=2}^{N} H_n \cdot \sin(\theta_n - n\phi) \cdot \sin(n \cdot \sin^{-1}(x)) \quad (8)$$

As described above, the process for determining table entries for an M-bit address LUT quantizes $x \in [-1,1]$ in $2^M$ values and determines the corresponding error correction data using equations (7) and (8). It is noted that equations (7) and (8) reduce to equations (4) and (5), respectively, when the phase offset, $\phi$, is zero.

The following describes how I-LUT and Q-LUT error correction values are determined for all samples of a data converter used in exemplary ATE. More specifically, prior to use, the error correction values for the I-LUT and the Q-LUT are determined for a range of signals that pass through the source and capture channels of the ATE. These error correction values are then stored in the I-LUT and Q-LUT, and are used to correct subsequent signals passing through the source and capture channels. The following is used to determine the range of signals (codes of a data converter) over which to determine the error correction values that are to be stored in the I-LUT and Q-LUT.

If a continuous sine wave is randomly sampled with uniform probability over the range $[0,2\pi]$, the probability that the sinusoid obtains the value x is given by $$p(x) = \frac{1}{\pi \cdot \sqrt{A^2 - x^2}},$$

where A is the amplitude of the sine wave. This distribution has the familiar "bathtub" curve shape with a minimum at mid-scale $x=0$ of $(\pi \cdot A)^{-1}$.

The probability that a code i is produced by a data converter that uniformly samples a sine wave on the interval $[0,2\pi]$ and quantizes to N bits is given by integrating the above expression over the amplitude range for code i, with the following result:

$$P(i) = \frac{1}{\pi} \cdot \left[ \sin^{-1}\left( \frac{FSR \cdot (i - 2^{N-1})}{A \cdot 2^N} \right) - \sin^{-1}\left( \frac{FSR \cdot (i - 1 - 2^{N-1})}{A \cdot 2^N} \right) \right],$$

where FSR is the bipolar full-scale range of the quantizer and A is the sine wave amplitude. If the sine wave amplitude is matched to the full-scale range of the quantizer, with zero DC (Direct Current) offset, the least probable output code occurs at mid-scale $i = 2^{N-1}$ with a probability of $1/(\pi \cdot 2^{N-1})$. Thus, the probability of occurrence of a mid-scale code decreases with the number of quantizer levels.

In order to provide a robust calibration, it is desirable to have the measurement process exercise every code of the converter. The expected number of code hits E(i) in a capture containing a number "Nsamples" of samples is given by $$E(i) = P(i) \cdot N\text{samples}.$$

Ensuring that the least probable mid-scale code is hit at least once implies that $$N\text{samples} \geq \pi \cdot 2^{N-1}.$$

Thus, calibration of a 16-bit converter using a fast radix-2 FFT process requires capture of at least 131,072 samples. While this constraint may be necessary to ensure that all converter codes are hit, it may not be sufficient, given that the sampling process can generate the same subset of codes on every cycle of the test waveform. In order to ensure that this does not occur, the integer number of cycles of the test waveform in a capture window may be mutually prime with respect to Nsamples.

The error correction data in the I-LUT and Q-LUT may be configured to correct for reflected, or aliased, harmonics in the instrument channel. Compensating for aliased frequency components includes correcting an aliased harmonic resulting from mixing of an $n^{th}$ component of a non-linearity with the clock used for sampling analog data. Compensating these aliased frequency components has the potential to improve the ATE's dynamic range when sourcing or capturing high frequency signals.

For an $N^{th}$ order correction, it is necessary to predict where, in the capture spectrum, each of the N harmonics will appear. Thus, for each harmonic $nf_0$ (where $f_0$ is the fundamental frequency), the following process is used to determine the frequency (FFT bin number) where an $N^{th}$ harmonic occurs, and the associated amplitude and phase to use in the LUT error correction data computations.

If the direct harmonic occurs in an odd Nyquist zone of the sampling clock defined as $$nf_o \in \left[(m-1)\cdot\frac{Fs}{2}, m\cdot\frac{Fs}{2}\right],$$

where m is odd and Fs is the Nyquist frequency, then the harmonic is deemed direct (i.e., not aliased). In this case, the frequency of the aliased harmonic is given by $$f_{nalias} = nf_0 \bmod \frac{Fs}{2}$$

where x mod y is the remainder of x/y. The magnitude and phase of this complex aliased frequency component, designated $H(f_{nalias})$, is used in equations (7) and (8) (or (4) and (5)) to determine the correction data. That is, for equations (7) and (8) (or (4) and (5)):

$$H_n = |H(f_{nalias})|$$

$$\theta_n = \angle H(f_{nalias}).$$

If the direct harmonic occurs in an even Nyquist zone of the sampling clock, then the harmonic is mirrored and the frequency of the aliased harmonic is defined as follows:

$$f_{nalias} = \frac{Fs}{2} - nf_0 \bmod \frac{Fs}{2}.$$

Given that the image of the even Nyquist zone is mirrored, the phase is conjugate and the harmonic amplitude and phase components of equations (7) and (8) (or (4) and (5)) are defined by $$H_n = |H(f_{nalias})|$$

$$\theta_n = -\angle H(f_{nalias}).$$

The negative phase of the aliased frequency component is used because the harmonic mixing with the clock produces a conjugate phase and not the channel non-linearity. Consequently, the conjugate of the alias spur phase is used to address the mixing effect.

The foregoing provides an example of a possible theory and approach for computing correction factors stored in a predistortion circuit as described above. Any other suitable approach may be used to determine correction values.

Having thus described several aspects of at least one embodiment of this invention, it is to be appreciated various alterations, modifications, and improvements will readily occur to those skilled in the art.

For example, the invention is described in connection with a sinusoidal signal generator in which sine waves are described. One of skill in the art will recognize that a sine wave is an example of a sinusoidal signal and that the invention may be employed with a sinusoidal signal of any desired format.

More generally, this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Such alterations, modifications, and improvements are intended to be part of this disclosure, and are intended to be within the spirit and scope of the invention. Accordingly, the foregoing description and drawings are by way of example only.

What is claimed is:

1. Apparatus for generating a sinusoidal signal, the apparatus comprising:

a) a digital to analog converter having a digital input and an analog output, the digital to analog converter adapted to produce an analog signal at the analog output representative of digital values at the digital input, the analog signal comprising an error represented by a conversion error function;

b) a first circuit having an output providing a plurality of values approximating at least a portion of a sinusoidal signal, the plurality of values comprising an approximation error; and c) a second circuit coupled between the output of the first circuit and the digital input of the digital to analog converter, the second circuit adapted to generate in-phase and quadrature correction values derived from the output of the first circuit to compensate, at least in part, for the conversion error function of the digital to analog converter and the approximation error of the first circuit.

2. The apparatus of claim 1, wherein the first circuit provides a plurality of values representing at least a portion of a parabolic signal.

3. The apparatus of claim 2, wherein the plurality of values provided by the first circuit provides a first plurality of values and the first circuit provides a second plurality of values approximating at least a second portion of a sine wave.

4. The apparatus of claim 3, wherein the second plurality of values are 90° out of phase relative to the first plurality of values.

5. The apparatus of claim 1, further comprising a control circuit, the control circuit coupled to the first circuit, the control circuit adapted to control the first circuit to repetitively output the plurality of values.

6. The apparatus of claim 5, wherein the control circuit controls the first circuit to repetitively output the plurality of values with a programmable repetition period.

7. Apparatus for generating a plurality of sinusoidal signals, the apparatus comprising, for each of the plurality of sinusoidal signals:
   a) a digital to analog converter having a digital input and an analog output, the digital to analog converter being adapted to produce an analog signal at the analog output representative of digital values at the digital input;
   b) a first circuit having an output providing a plurality of values approximating at least a portion of a sinusoidal signal, the plurality of values comprising an approximation error; and
   c) a second circuit coupled between the output of the first circuit and the digital input of the digital to analog converter, the second circuit adapted to distort the values at the output of the first circuit to compensate, at least in part, for the approximation error of the first circuit, wherein the second circuit comprises a first look-up table and a second look-up table, each having an input derived from the output of the first circuit, the first look-up table and the second look-up table each having an output subtracted from the output of the first circuit.

8. The apparatus of claim 7, further comprising a phase shift circuit coupling the output of the first circuit to the second look-up table.

9. Apparatus for generating a plurality of sinusoidal signals, the apparatus comprising, for each of the plurality of sinusoidal signals:
   a) a digital to analog converter having a digital input and an analog output, the digital to analog converter being adapted to produce an analog signal at the analog output representative of digital values at the digital input;
   b) a first circuit having an output providing a plurality of values approximating at least a portion of a sinusoidal signal, the plurality of values comprising an approximation error; and
   c) a second circuit coupled between the output of the first circuit and the digital input of the digital to analog converter, the second circuit adapted to distort the values at the output of the first circuit to compensate, at least in part, for the approximation error of the first circuit and a conversion error of the digital to analog converter; and
   a plurality of channel circuits, each channel circuit having a clock input, wherein the analog output of each of the plurality of digital to analog converters is coupled to the clock input of a channel circuit of the plurality of channel circuits.

10. Apparatus for generating a plurality of sinusoidal signals, the apparatus comprising, for each of the plurality of sinusoidal signals:
    a) a digital to analog converter having a digital input and an analog output, the digital to analog converter being adapted to produce an analog signal at the analog output representative of digital values at the digital input;
    b) a first circuit having an output providing a plurality of values approximating at least a portion of a sinusoidal signal, the plurality of values comprising an approximation error; and
    c) a second circuit coupled between the output of the first circuit and the digital input of the digital to analog converter, the second circuit adapted to distort the values at the output of the first circuit to compensate, at least in part, for the approximation error of the first circuit and a conversion error of the digital to analog converter, wherein the first circuit comprises a programmable gate array comprising a plurality of configurable logic elements, the plurality of configurable logic elements being configured to compute the plurality of values.

11. The apparatus of claim 10, wherein the first circuit provides a plurality of values representing at least a portion of a parabolic signal.

12. The apparatus of claim 11, wherein the first circuit comprises:
    i) an accumulator having an output;
    ii) a first sub-circuit having an input and an output, the output having a value that is the 2's complement of the value at the input; and
    iii) a second sub-circuit, the second sub-circuit having a first input and a second input and an output having a value that is the product of a value at the first input and a value at the second input,
    wherein the output of the accumulator is coupled to input of the first sub-circuit and the first input of the second sub-circuit and the output of the first sub-circuit is coupled to the second input of the second sub-circuit.

13. A method of generating a sinusoidal signal, the method comprising:
    a) generating a string of digital values representing an approximation of at least a portion of a sinusoidal signal;
    b) distorting the digital values using in-phase and quadrature correction values derived from the digital values to compensate for an error in approximating the sinusoidal signal and a digital to analog conversion error; and
    c) converting the distorted digital values to an analog signal.

14. The method of claim 13, wherein generating a string of values comprises computing a string of values in accordance with a parabolic function.

15. A method of generating a sinusoidal signal, the method comprising:
    a) generating a string of digital values representing an approximation of at least a portion of a sinusoidal signal;
    b) distorting the digital values to compensate for an error in approximating the sinusoidal signal and a conversion error;
    c) converting the distorted digital values to an analog signal; and
    d) storing in each of a first look-up table and a second look-up table a plurality of distortion values, and wherein distorting the digital values comprises coupling each digital value in the string to the first look-up table and the second look-up table to generate an address to each of the first look-up table and the second look-up table and using a value stored at the address in the look-up table as an offset to the digital value.

16. The method of claim 15, wherein storing in each of a first look-up table and a second look-up table a plurality of distortion values comprises storing distortion values in the first look-up table derived from measurements of a first signal and storing distortion values in the second look-up table derived from measurements of a second signal, phase shifted from the first signal.

17. The method of claim 16, wherein coupling each digital value in the string to the first look-up table and the second look-up table comprises coupling the string to the second look-up table with a phase shift of 90 degrees.

18. A method of manufacturing a semiconductor device, the method of manufacture including the method of claim 13, the method of manufacturing comprising:

a) generating a test signal from the analog signal generated according to the method of claim 14;
b) testing the semiconductor device with the test signal to obtain a test result; and
c) altering the manufacturing operation in response to the test result.

19. The method of claim 18, wherein the test result comprises a statistical value computed from measurements taken while testing a plurality of semiconductor devices.

* * * * *

UNITED STATES PATENT AND TRADEMARK OFFICE
CERTIFICATE OF CORRECTION

PATENT NO. : 7,933,942 B2
APPLICATION NO. : 11/540810
DATED : April 26, 2011
INVENTOR(S) : William Scott McDonald Page 1 of 1

It is certified that error appears in the above-identified patent and that said Letters Patent is hereby corrected as shown below:

On the Title Page, line 1, Item (54), Title, "SIGN" should read --SINE--.

In column 1, line 1, "SIGN" should read --SINE--.

In column 23, line 2, Claim 18, "claim 14;" should read --claim 13;--.

Signed and Sealed this
Fourteenth Day of June, 2011

David J. Kappos
*Director of the United States Patent and Trademark Office*